United States Patent
Allin et al.

(10) Patent No.: US 11,188,434 B2
(45) Date of Patent: Nov. 30, 2021

(54) SYSTEMS AND METHODS FOR MONITORING EXECUTION OF STRUCTURED QUERY LANGUAGE (SQL) QUERIES

(71) Applicant: Ab Initio Technology LLC, Lexington, MA (US)

(72) Inventors: Glenn John Allin, Arlington, MA (US); Ian Robert Schechter, Sharon, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 15/835,823

(22) Filed: Dec. 8, 2017

(65) Prior Publication Data

US 2019/0179723 A1    Jun. 13, 2019

(51) Int. Cl.
*G06F 11/32* (2006.01)
*G06F 16/2455* (2019.01)
(Continued)

(52) U.S. Cl.
CPC .............. *G06F 11/323* (2013.01); *G06F 8/34* (2013.01); *G06F 16/217* (2019.01);
(Continued)

(58) Field of Classification Search
CPC .. G06F 11/323; G06F 11/3409; G06F 16/245; G06F 16/24534; G06F 16/2455
(Continued)

(56) References Cited

U.S. PATENT DOCUMENTS

| 5,966,072 A | 10/1999 | Stanfill et al. |
| 6,438,741 B1 | 8/2002 | Al-omari et al. |

(Continued)

FOREIGN PATENT DOCUMENTS

| EP | 2657860 A1 | 10/2013 |
| WO | WO 2014/209260 A1 | 12/2014 |
| WO | WO 2017/024164 A1 | 2/2017 |

OTHER PUBLICATIONS

Mishra, C., et al., ConEx: A System for Monitoring Queries, SIGMOD '07: Proceedings of the 2007 ACM SIGMOD international conference on Management of data, Jun. 2007, pp. 1076-1078, [retrieved on Nov. 24, 2020], Retrieved from the Internet: <URL:http://dl.acm.org/>.*

(Continued)

*Primary Examiner* — Geoffrey R St Leger
(74) *Attorney, Agent, or Firm* — Wolf, Greenfield & Sacks, P.C.

(57) ABSTRACT

Techniques for monitoring execution of structured query language (SQL) queries. The techniques include: obtaining a SQL query; generating a query plan for the SQL query, the query plan comprising a plurality of operations to be performed by the data processing system including at least a first operation and a second operation; displaying a graphical user interface (GUI) containing a plurality of GUI elements including a first GUI element representing the first operation and a second GUI element representing the second operation; during execution of the SQL query, gathering tracking information for the SQL query including gathering first tracking information for the first operation and second tracking information for the second operation; and displaying, in the GUI, at least some of the first tracking information in association with the first GUI element and at least (Continued)

some of the second tracking information in association with the second GUI element.

19 Claims, 11 Drawing Sheets

(51) Int. Cl.
*G06F 8/34* (2018.01)
*G06F 16/21* (2019.01)
*G06F 11/34* (2006.01)
*G06F 8/10* (2018.01)

(52) U.S. Cl.
CPC ............ *G06F 16/2455* (2019.01); *G06F 8/10* (2013.01); *G06F 11/3409* (2013.01); *G06F 2201/80* (2013.01)

(58) Field of Classification Search
USPC .................................................. 717/127–128
See application file for complete search history.

(56) References Cited

U.S. PATENT DOCUMENTS

| | | | |
|---|---|---|---|
| 7,716,630 | B2 | 5/2010 | Wholey et al. |
| 8,195,643 | B2 | 6/2012 | Weyerhaeuser et al. |
| 8,838,579 | B2 | 9/2014 | Weyerhaeuser et al. |
| 9,116,955 | B2 | 8/2015 | Schechter et al. |
| 9,208,141 | B2 * | 12/2015 | Chan .................... G06F 17/248 |
| 9,798,527 | B1 | 10/2017 | Bendersky et al. |
| 10,528,599 | B1 | 1/2020 | Pandis |
| 10,817,495 | B2 | 10/2020 | Dickie |
| 2003/0163512 | A1 | 8/2003 | Mikamo |
| 2004/0220942 | A1 | 11/2004 | Agrawal et al. |
| 2004/0250098 | A1 | 12/2004 | Licis |
| 2007/0271381 | A1 | 11/2007 | Wholey et al. |
| 2008/0140622 | A1 | 6/2008 | Bestgen et al. |
| 2011/0055426 | A1 | 3/2011 | Lakshmanan et al. |
| 2011/0197122 | A1 * | 8/2011 | Chan .................... G06F 17/248 715/234 |
| 2012/0089595 | A1 | 4/2012 | Jaecksch |
| 2012/0284255 | A1 | 11/2012 | Schechter et al. |
| 2013/0290298 | A1 | 10/2013 | Weyerhaeuser et al. |
| 2014/0033173 | A1 | 1/2014 | Frenkiel |
| 2015/0088856 | A1 | 3/2015 | Hunter et al. |
| 2016/0154896 | A1 | 6/2016 | Simitsis et al. |
| 2017/0083573 | A1 | 3/2017 | Rogers et al. |
| 2017/0147644 | A1 | 5/2017 | Lee et al. |
| 2017/0308411 | A1 | 10/2017 | Brill |
| 2018/0113905 | A1 | 4/2018 | Goerzig et al. |
| 2018/0285401 | A1 | 10/2018 | Dickie |
| 2019/0370407 | A1 | 12/2019 | Dickie |
| 2021/0182263 | A1 | 6/2021 | Dickie |

OTHER PUBLICATIONS

Gawade, M., et al., Stethoscope: A Platform for Interactive Visual Analysis of Query Execution Plans, Proceedings of the VLDB Endowment, vol. 5, Issue 12, Aug. 2012, pp. 1926-1929, [retrieved on Nov. 24, 2020], Retrieved from the Internet: <URL:http://dl.acm.org/>.*

International Search Report and Written Opinion dated Jun. 21, 2018 in connection with International Application No. PCT/US2018/025144.

International Search Report and Written Opinion for International Application No. PCT/US2018/064217 dated Mar. 13, 2019.

[No Author Listed], ApexSQL Plan 2017—Screen Shot Tour. Jun. 25, 2017. Retrieved from the Internet: https://web.archive.org/web/20170625041627/https://blog.apexsql.com/apexsql-plan-2017-screen-shot-tour/ [retrieved on Feb. 27, 2019] 18 pages.

[No Author Listed], Using Oracle Database Cloud Service Viewing Real Time SQL Monitor. Oracle Database Cloud Service. Help Center. 2016.

Farina, SQL Server 2014 Real Time Query Monitoring. Zero to Hero: 12 Tips for the Accidental DBA. Last update Sep. 9, 2014; 7 pages.

Koltakov, Real-Time SQL Monitoring. Oracle. Dec. 2009; 30 pages.

International Search Report and Written Opinion for International Application No. PCT/US2019/033573 dated Jul. 26, 2019.

* cited by examiner

Parameters

Parameters for 'join'

| | Name | Value | Resolved Value |
|---|---|---|---|
| ☒ | count | 2 | 2 |
| ☒ | sorted input | True | True |
| ☒ | key | {} | {} |
| ☒ | transform | out :: join(c0, c1) = begin end | out :: join(c0, c1) = begin end |
| ☒ | join type | Inner Join | Inner Join |
| ☒ | dedup0 | False | False |
| ☒ | dedup1 | False | False |
| ☒ | select0 | | |
| ☒ | select1 | | |
| ☒ | override key 0 | {} | {} |
| ☒ | override key 1 | | |
| ☒ | max memory | 8388608 | 8388608 |
| ☒ | check sort | False | False |
| ☒ | sql null comparisons | False | False |
| ☒ | error group | | |
| ☒ | log group | | |
| ☒ | reject threshold | Abort on first reject | Abort on first reject |

FIG. 5D

SYSTEMS AND METHODS FOR MONITORING EXECUTION OF STRUCTURED QUERY LANGUAGE (SQL) QUERIES

BACKGROUND

A data processing system may use one or more computer programs to process data. One or more of the computer programs utilized by the data processing system may be developed as dataflow graphs. A dataflow graph may include components, termed "nodes" or "vertices," representing data processing operations to be performed on input data and links between the components representing flows of data. Nodes of a dataflow graph may include one or more input nodes representing respective input datasets, one or more output nodes representing respective output datasets, and one or more nodes representing data processing operations to be performed on data. Techniques for executing computations encoded by dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety.

SUMMARY

Some embodiments are directed to a data processing system, comprising: at least one computer hardware processor; and at least one non-transitory computer-readable storage medium storing processor-executable instructions that, when executed by the at least one computer hardware processor, cause the at least one computer hardware processor to perform: obtaining a federated structured query language (SQL) query, generating a query plan for the federated SQL query, the query plan comprising a plurality of data processing operations to be performed by the data processing system including at least a first data processing operation and a second data processing operation; displaying a graphical user interface (GUI) containing a plurality of GUI elements including a first GUI element representing the first data processing operation and a second GUI element representing the second data processing operation; during execution of the federated SQL query, gathering tracking information for the federated SQL query including gathering first tracking information for the first data processing operation and second tracking information for the second data processing operation; and displaying, in the GUI, at least some of the first tracking information in association with the first GUI element and at least some of the second tracking information in association with the second GUI element.

Some embodiments are directed to at least one non-transitory computer-readable storage medium storing processor-executable instructions that, when executed by at least one computer hardware processor, cause the at least one computer hardware processor to perform: obtaining a federated structured query language (SQL) query, generating a query plan for the federated SQL query, the query plan comprising a plurality of data processing operations to be performed by the data processing system including at least a first data processing operation and a second data processing operation; displaying a graphical user interface (GUI) containing a plurality of GUI elements including a first GUI element representing the first data processing operation and a second GUI element representing the second data processing operation; during execution of the federated SQL query, gathering tracking information for the federated SQL query including gathering first tracking information for the first data processing operation and second tracking information for the second data processing operation; and displaying, in the GUI, at least some of the first tracking information in association with the first GUI element and at least some of the second tracking information in association with the second GUI element.

Some embodiments are directed to a method, performed by at least one computer hardware processor, the method comprising: obtaining a federated structured query language (SQL) query, generating a query plan for the federated SQL query, the query plan comprising a plurality of data processing operations to be performed by the data processing system including at least a first data processing operation and a second data processing operation; displaying a graphical user interface (GUI) containing a plurality of GUI elements including a first GUI element representing the first data processing operation and a second GUI element representing the second data processing operation; during execution of the federated SQL query, gathering tracking information for the federated SQL query including gathering first tracking information for the first data processing operation and second tracking information for the second data processing operation; and displaying, in the GUI, at least some of the first tracking information in association with the first GUI element and at least some of the second tracking information in association with the second GUI element.

Some embodiments are directed to at least one non-transitory computer-readable storage medium storing processor-executable instructions comprising: means for obtaining a federated structured query language (SQL) query; means generating a query plan for the federated SQL query, the query plan comprising a plurality of operations to be performed by the data processing system including at least a first data processing operation and a second data processing operation; means for displaying a graphical user interface (GUI) containing a plurality of GUI elements including a first GUI element representing the first data processing operation and a second GUI element representing the second data processing operation; means for, during execution of the federated SQL query, gathering tracking information for the federated SQL query including gathering first tracking information for the first data processing operation and second tracking information for the second data processing operation; and displaying, in the GUI, at least some of the first tracking information in association with the first GUI element and at least some of the second tracking information in association with the second GUI element.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 5D is a diagram of parameters associated with the data processing operation shown in FIG. 5C, in accordance with some embodiments of the technology described herein.

DETAILED DESCRIPTION

Figure 1:
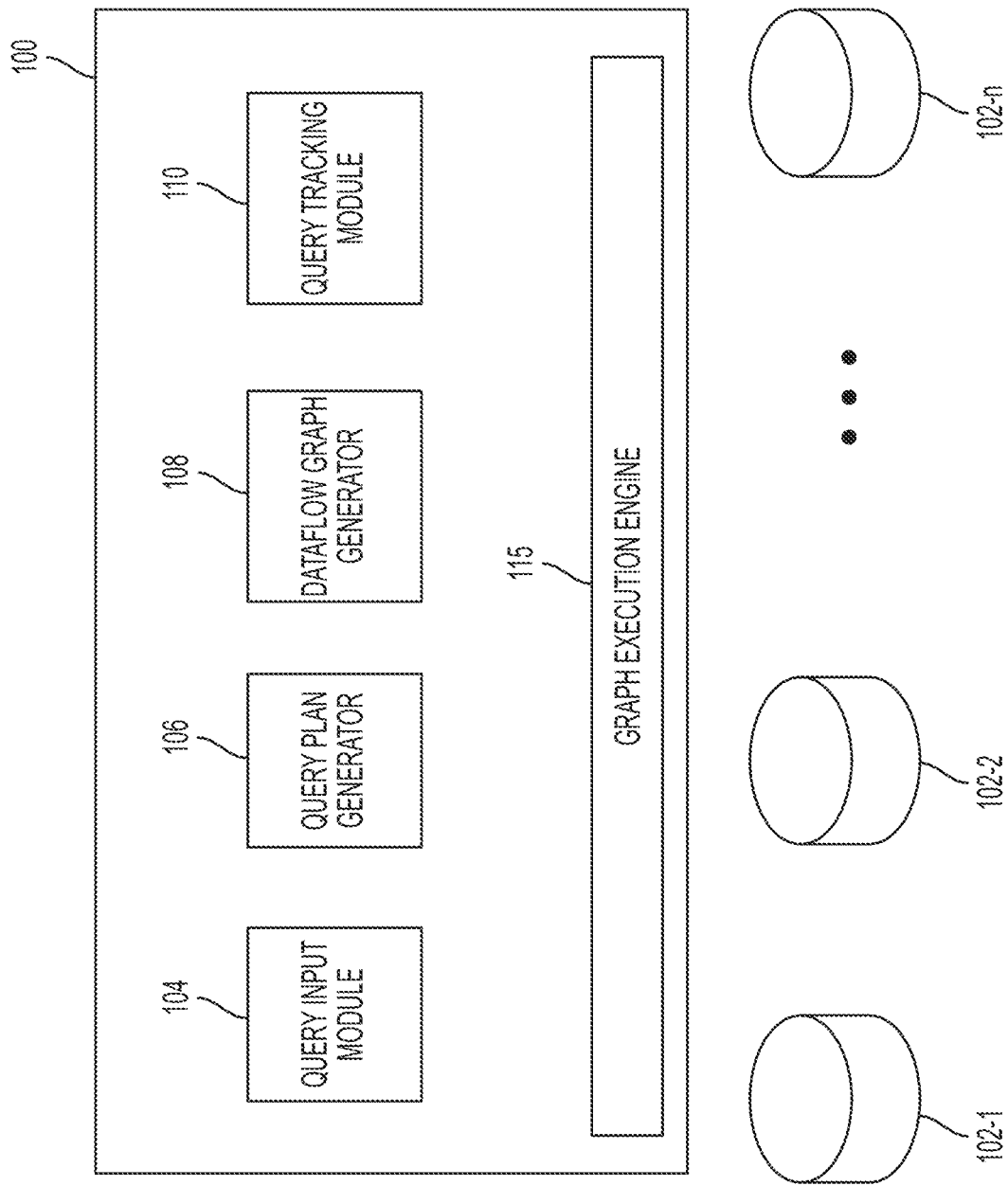
FIG. 1 is a diagram of an illustrative data processing system, in accordance with some embodiments of the technology described herein.

Aspects of the technology described herein are related to increasing the speed and throughput of data processing systems by improving upon conventional techniques for executing structured query language (SQL) queries.

The inventors have appreciated that conventional data processing systems provide very little information about SQL queries executing thereon. For example, some conventional data processing systems merely provide an indication that a SQL query is executing, and users have to wait to see if and when the SQL query completes. This is very frustrating to users, as they don't know how long it will take for the SQL query to complete or if it will complete at all. As another example, some conventional data processing systems allow users to see, after completion of a SQL query, what rows in a database were accessed during execution of the SQL query. This approach provides no information during execution of the SQL query and the information provided after completion of the SQL query is of limited use, as this information was not available during execution of the SQL query and, as a result, a user could not stop and/or adjust the SQL query without waiting for it to complete, which could take a long time. As another example, some conventional data processing systems provide an indication of how much processing power has been consumed by each SQL query that is running. However, such systems do not provide any sense of how much progress has been made toward completion of the query. For example, knowing that one hour has elapsed since the SQL query started executing does not indicate how much more time is required for the execution of the query to complete.

None of these conventional data processing systems provides diagnostic information, during execution of a SQL query, about why execution of the SQL query is taking a long time. The inventors have recognized that providing such information to the user during execution may improve performance of conventional data processing systems. Accordingly, some embodiments provide for techniques that allow a data processing system to provide a user with detailed information about a SQL query while the SQL query is executing. For example, during execution of a SQL query, the data processing system may provide an indication to the user of how many records are processed by each data processing operation implicated by the SQL query. In this way, the user may see not only how many rows from an input table have been processed, but how many of these records have made it through each stage of the query plan for the SQL query at any given time.

As a result of being provided detailed tracking information about an executing SQL query, a user can see if there are problems (e.g., bugs) with the SQL query that could cause the query taking much longer than intended, and he or she can do this while the SQL query is executing. Similarly, the user can see if there are bottlenecks in the execution plan or ways to optimize the SQL query. Additionally, the user can see other state information, such as the amount of spilling that take place during execution of the query. Accordingly, a user can stop a SQL query that has bugs or other problems, optimize a SQL query, re-write the SQL query in an improved way, all which improves the speed, resource utilization (e.g., CPU, memory, and network resources), and throughput of conventional data processing systems that execute SQL queries.

In addition, the techniques described herein allow for a data processing system to provide detailed tracking information for federated SQL queries, which are SQL queries that read and/or write data records from/to different types of database systems. Conventional data processing systems do not provide any tracking information for federated SQL queries.

Some embodiments of the technology described herein address some of the above-discussed drawbacks of conventional data processing systems and techniques for executing SQL queries. However, not every embodiment addresses every one of these drawbacks, and some embodiments may not address any of them. As such, it should be appreciated that aspects of the technology described herein are not limited to addressing all or any of the above discussed drawbacks of conventional data processing systems and techniques for executing SQL queries.

Accordingly, some embodiments provide for a data processing system configured to perform: (1) obtaining a structured query language (SQL) query; (2) generating a query plan for the SQL query, the query plan comprising a plurality of operations to be performed by the data processing system including at least a first operation and a second operation; (3) generating a graphical user interface (GUI) containing a plurality of GUI elements including a first GUI element representing the first operation and a second GUI element representing the second operation; and (4) during execution of the SQL query, gathering tracking information for the SQL query including gathering first tracking information for the first operation and second tracking information for the second operation; and displaying, in the GUI, at least some of the first tracking information in association with the first GUI element and at least some of the second tracking information in association with the second GUI element.

In some embodiments, the generated GUI comprises a dataflow graph for executing the SQL query. The dataflow graph may be generated from the query plan to include: (1) a first node to represent the first data processing operation, (2) a second node to represent the second data processing operation, and (3) a directed link from the first node to the second node, which indicates that data records are processed using the first data processing operation before they are processed using the second data processing operation. In some embodiments, the GUI is non-tabular (i.e., is not a table).

In some embodiments, generating the dataflow graph may include generating, based on the query plan, at least one data structure representing the dataflow graph, the dataflow graph comprising a plurality of nodes including the first node and the second node and a plurality of edges connecting the plurality of nodes, each of the plurality of nodes corresponding to a respective operation in the plurality of operations, the plurality of edges representing flows of data among nodes in the plurality of nodes.

In some embodiments, gathering the first tracking information for the first operation comprises tracking a number of data records processed using each of one or more data processing operations represented by nodes in the data flow graph. For each data processing operation, the number data records processed via the data processing operation may be displayed via a graphical user interface (e.g., proximate the node in the dataflow graph that represents the data processing operation).

Examples of tracking information for a data processing operation include, but are not limited to, a number of data records processed via the first operation, a degree of parallelism employed for performing the first operation, information identifying one or more computing devices used for performing the first operation, an amount of processing resources used for performing the first operation, an amount of memory used for performing the first operation, an amount of time used for performing the first operation, a measure of skew among processing loads on computing devices performing the first operation, parameters of the first operation, information indicating whether the first operation completed.

In some embodiments, the plurality of operations in the query plan comprise include at least one operation for accessing data records in a first data source of a first type and at least another operation for accessing data records in a second data source of a second type different from the first type. The first data source of the first type may be a flat file data source, a multi-file data source, a Hadoop data source, an Oracle data source, a Teradata data source, a DB2 data source, a SQL Server data source, an Informix data source, a MongoDB data source, an SAP data source, or a metadata data source. In some embodiments, a data source may be different from a database table.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 is a diagram of an illustrative data processing system 100, in accordance with some embodiments of the technology described herein. As illustrated in FIG. 1, data processing system 100 includes query input module 104, query plan generator 106, dataflow graph generator 108, query tracking module 110, and graph execution engine 115.

Data processing system 100 is configured to access (e.g., read data from and/or write data to) data stores 102-1, 102-2, . . . , and 102-n. Each of data stores 102-1, 102-2, . . . , and 102-n, may store one or more datasets. A data store may store any suitable type of data in any suitable way. A data store may store data as a flat text file, a spreadsheet, using a database system (e.g., a relational database system), or in any other suitable way. In some instances, a data store may store transactional data. For example, a data store may store credit card transactions, phone records data, or bank transactions data. It should be appreciated that data processing system 100 may be configured to access any suitable number of data stores of any suitable type, as aspects of the technology described herein are not limited in this respect. A data store from which data processing system 100 may be configured to read data may be referred to as a data source. A data store from to which data processing system 100 may be configured to write data may be referred to as a data sink.

In some embodiments, the data stores 102-1, 102-2, . . . , 102-n may be of a same type (e.g., all may be relational databases) or different types (e.g., one may be relational database while another may be a data store that stores data in files. A data store may be a SQL server data store, an ORACLE data store, a TERADATA data store, a flat file data store, a multi-file data store, a HADOOP data store, a DB2 data store, a Microsoft SQL SEVER data store, an INFORMIX data store, a SAP data store, a MongoDB data store, a metadata datastore, and/or or any other suitable type of data store, as aspects of the technology described herein are not limited in this respect.

In some embodiments, query input module 104 may be configured to receive an input SQL query. In some embodiments, the query input module 104 may be configured to receive an input SQL query from a user. For example, the query input module 104 may be configured to generate a graphical user interface through which a user may input a SQL query. As another example, the query input module 104 may be configured to receive information provided by a user through a graphical user interface (one that was not necessarily generated by the query input module 104 itself). In some embodiments, the query input module 104 may be configured to receive an input SQL query from another computer program. For example, the query input module 104 may expose an application programming interface (API) through which an input SQL query may be provided, may access an SQL query in response to a notification that a SQL query is to be accessed, or receive the input SQL query from the other computer program in any other suitable way.

The SQL query received by query input module 104 may involve reading data from and/or writing data to a single data store. Alternatively, the SQL query received by the query input module 104 may involve read data from and/or writing data to multiple data stores. When the data stores are of different types, the SQL query may be referred to as a federated SQL query.

In some embodiments, the query plan generator 106 is configured to generate a query plan from a SQL query from the SQL query received by the query input module 104. The generated query plan may identify one or more data processing operations to be performed if the SQL query were executed. The generated query plan may further specify an order in which the identified data processing operations are to be executed. As such, the generated query plan may represent a sequence of data processing operations to perform in order to execute the SQL query received by query input module 104. The query plan generator 106 may be configured to generate a query plan in any suitable way. For example, in some embodiments, the query plan generator 106 may implement any of the techniques for generating query plans described in U.S. Pat. No. 9,116,955, titled "Managing Data Queries," which is incorporated by reference herein in its entirety.

In some embodiments, the dataflow graph generator 108 is configured to generate a dataflow graph from the query plan generated by the query plan generator 106. The dataflow graph generator 108 may be configured to generate a dataflow graph from a query plan in any suitable way. For example, in some embodiments, the dataflow graph generator 108 may implement any of the techniques for generating query plans described in U.S. Pat. No. 9,116,955, titled "Managing Data Queries," which is incorporated by reference herein in its entirety.

In some embodiments, the dataflow graph may be generated from a query plan at least in part by generating the dataflow graph to include a node for each of at least a subset (e.g., some or all) of the data processing operations identified in the query plan. Subsequently, the order of data processing operations specified in the query plan may be used to generate links connecting nodes in the dataflow graph. For example, when the generated query plan indicates that a first data processing operation is performed before a second data processing operation, the generated dataflow graph may have a first node (representing the first data processing operation) and a second node (representing the second data processing operation) and one or more links specifying a path from the first node to the second node.

In some embodiments, generating the dataflow graph from the query plan comprises adding one or more nodes to the graph representing input and/or output data sources. For example, generating the dataflow graph may comprise adding an input node for each of the data sources from which data records are to be read during execution of the SQL query. Each of the input nodes may be configured with parameter values associated with the respective data source. These values may indicate how to access the data records in the data source. As another example, generating the dataflow graph may comprise adding an output node for each of the data sinks to which data records are to be written during execution of the SQL query. Each of the output nodes may be configured with parameter values associated with the respective data sinks. These values may indicate how to write the data records to the data source.

In some embodiments, generating the dataflow graph may comprise determining a processing layout for performing the data processing operations in the dataflow graph. The processing layout for a data processing operation may specify how many computing devices are to be used for performing the data processing operation and may identify the particular computing devices to be used to perform the data processing operation. For example, generating the dataflow graph may comprise determining, for each of one or more nodes, whether the data processing operation is to be performed using a single device (e.g., a single processor, a single virtual machine, etc.) or multiple devices (e.g., multiple processors, multiple virtual machines, etc.) and which devices should be used. In some embodiments, different degrees of parallelism may be assigned to different nodes. As such, it should be appreciated that different processing layouts may be assigned to different data processing operations that are to be performed during execution of the dataflow graph generated from the SQL query obtained by the query input module 104.

In some embodiments, graph execution engine 115 is configured to execute one or more dataflow graphs including, for example, any dataflow graph by dataflow graph generator 108. The graph execution engine may comprise a co-operating system or any other suitable execution environment for executing dataflow graphs. Aspects of environments for developing and executing dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety.

Query tracking module 110 is configured to gather tracking information about a SQL query during its execution. Examples of tracking information are provided herein. For example, in some embodiments, query tracking module 110 may be configured to gather tracking information during execution of the dataflow graph generated (e.g., using query planner 106 and dataflow graph generator 108) from a received SQL query. In some embodiments, the graph execution engine 115 may be configured to monitor execution of each of one or more data processing operations in the dataflow graph and may collect information during the execution from which information the tracking data may be obtained. The collected information may include at least some of the tracking data directly and/or at least some of the tracking data may be derived from the collected information. By way of example and not limitation, the graph execution engine may keep track of the number of data records processed by a particular data processing operation, the amount of processing power and/or memory utilized by a data processing operation, and/or any other suitable tracking information, examples of which are provided herein. This collected information, in turn, may include at least some of the tracking information being gathered and/or at least some of the tracking information may be derived from this collected information.

Figure 2:
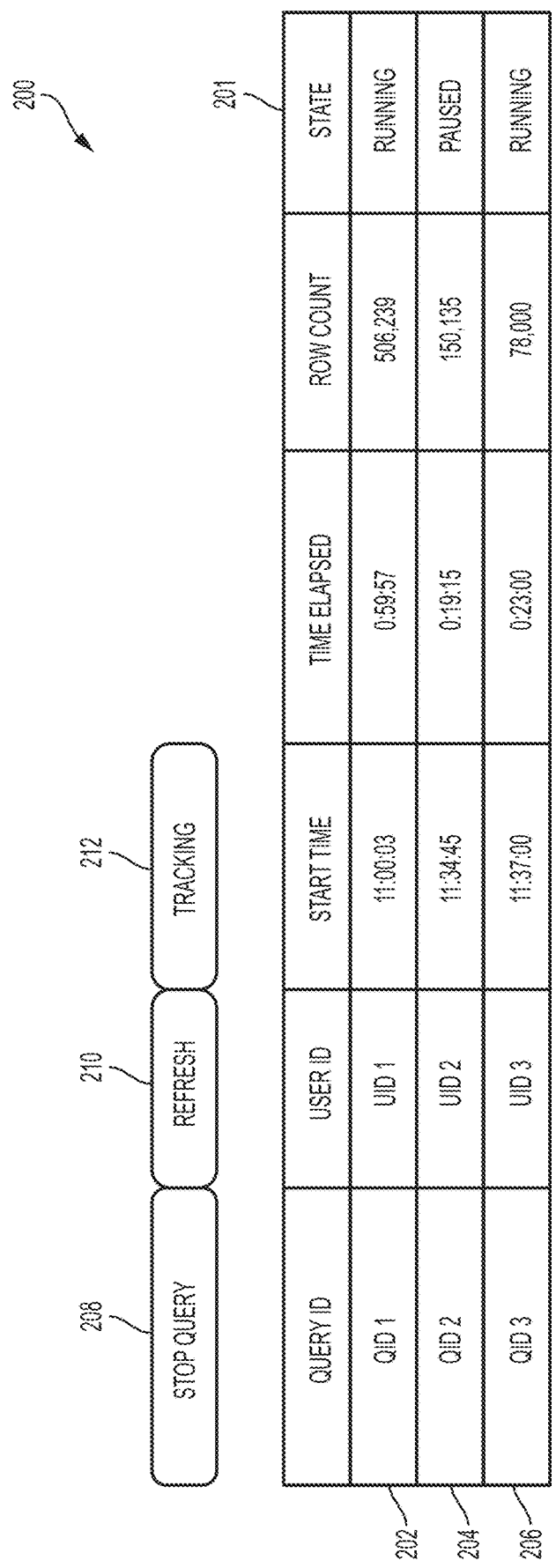
FIG. 2 is a diagram of an illustrative graphical user interface (GUI) showing information about active queries, such as structured query language (SQL) queries, in a data processing system, in accordance with some embodiments of the technology described herein.

FIG. 2 is a diagram of an illustrative graphical user interface (GUI) 200 showing information about active queries in a data processing system. The GUI 200 may provide summary information about execution of each of one or more of (e.g., all) the active queries in the data processing system. As shown in FIG. 2, the GUI 200 includes a table 201 having a row for each query that is active in the data processing system. An active query may be a query whose execution has commenced, but has not yet completed.

As shown in FIG. 2, for example, the table 201 contains rows 202, 204, and 206 each containing information for respective active queries. For each active query, the information in the corresponding row includes a query identifier (e.g., "QID 1" in row 202), a user identifier (e.g., "UID 1" in row 202), information indicating when execution of the active query commenced (e.g., "11:00:03" in row 202), information indicating how much time elapsed from the time at which execution of the active query commenced (e.g., "0:59:57" in row 202), information indicating how many records (e.g., rows of a table) have been processed so far during execution of the active query (e.g., "506,239" in row 202), and information indicating the state of the active query (e.g., "running" in row 202 and "paused" in row 204). It should be appreciated, however, that table 201 may include any other suitable information about each active query in addition to or instead of the information shown in table 201, as aspects of the technology described herein are not limited in this respect. It should also be appreciated that, although in the illustrative embodiment of FIG. 2 the information about active queries is shown as part of a table, in other embodiments, at least some of this information may be displayed in non-tabular form (e.g., using graphs, charts, visualizations, lists, etc.).

As shown in FIG. 2, the GUI 200 further provides control elements which allow a user of the GUI 200 to perform one or more actions for one or more of the queries active on the data processing system. For example, GUI 200 provides a GUI control element 208 through which a user may stop execution of an active query (e.g., if the query has been executing for longer than expected, the number of records processed by the query is larger than expected, etc.). For instance, a user may select an active query (e.g., by selecting a row in table 201) and select the GUI control element 208 (which in this illustrative example is a button labeled "Stop Query" but may be any other suitable type of GUI element) to stop execution of the selected active query. In some embodiments, stopping the execution of a selected active query may cause execution of the active query to be paused such that its execution may be subsequently resumed. In other embodiments, stopping the execution of a selected active query may cause the execution of that active query to be terminated so that the query cannot be resumed.

As another example, GUI 200 provides a GUI control element 210 through which a user may request that information about active queries be refreshed. For example, in response to a user selection of GUI control element 210, information indicating how long active queries have been executing and how many records have been processed may be updated in table 201.

As another example, GUI 200 provides a GUI control element 212 through which a user may request that further information about a particular active query be provided. For example, in some embodiments, a user may select an active query (e.g., by selecting a row of table 201 or in any other suitable way) and select the GUI control element 212 (which in this illustrative example is a button labeled "Tracking" but may be any suitable type of GUI element other than a button) in response, another GUI showing more detailed tracking information for the selected active query may be generated and presented to the user. In some embodiments, the more detailed information may be provided in a non-tabular graphical user interface, an illustrative example of which is shown in FIG. 3 and is discussed below.

It should be appreciated that the GUI 200 may have one or more other control elements in addition to or instead of the control elements 208, 210, and 212, as aspects of the technology described herein are not limited in this respect.

Figure 3:
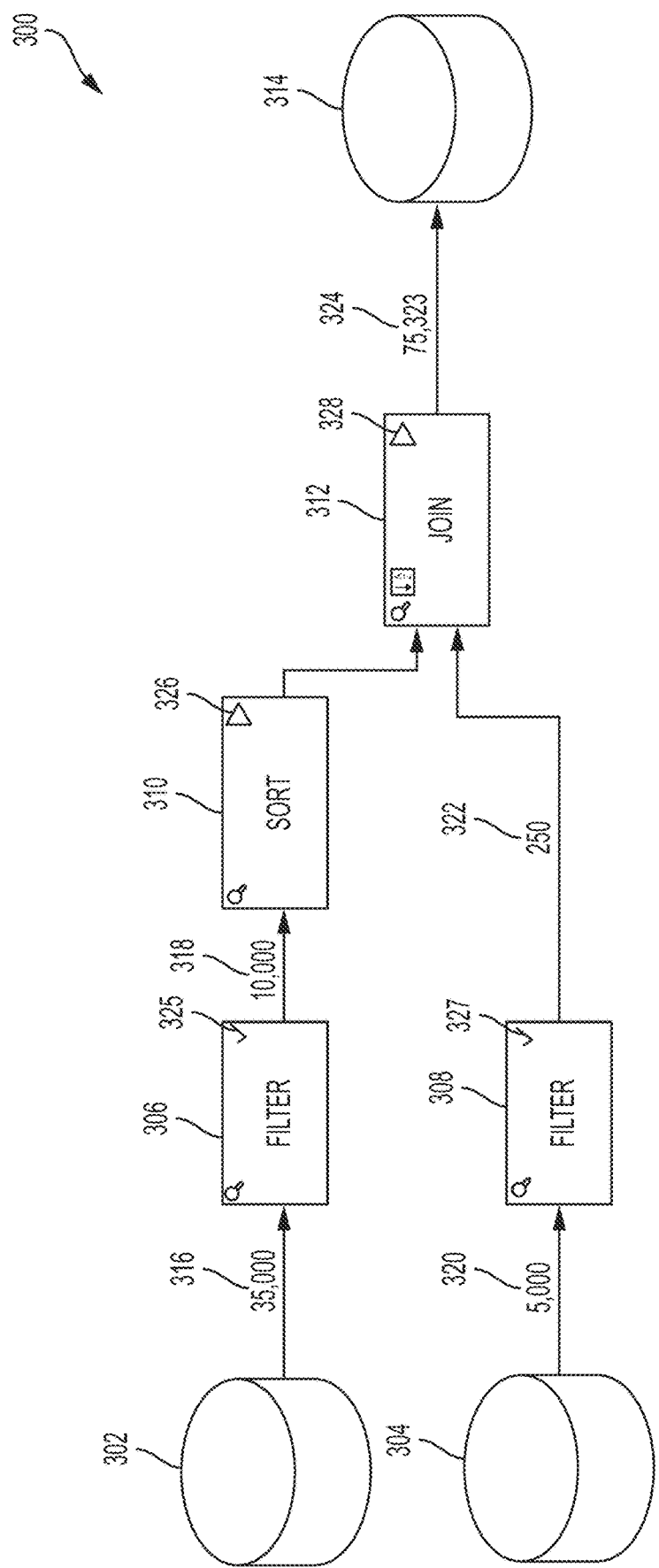
FIG. 3 is a diagram of an illustrative GUI showing tracking information for multiple data processing operations represented by nodes in a dataflow graph generated from an input SQL query, in accordance with some embodiments of the technology described herein.

FIG. 3 is a diagram of an illustrative GUI 300 showing tracking information for multiple data processing operations represented by nodes in a dataflow graph generated from an input SQL query. The dataflow graph may be generated from an input SQL query by data processing system 100 as described with reference to FIG. 1.

As described herein, a dataflow graph may include multiple nodes including: (a) one or more input nodes representing one or more respective data sources (e.g., one or more input datasets); (b) one or more output nodes, representing one or more respective data sinks (e.g., one or more output datasets); and/or (c) one or more nodes representing data processing operations that may be performed on the data. Directed links or edges among nodes in the dataflow graph represent flows of data between the nodes.

As shown in FIG. 3, the dataflow graph includes input nodes 302 and 304 representing respective data sources, an output node 314 representing a data sink, nodes 306 and 308 representing filtering operations, node 310 representing a sorting operation, and node 312 representing a join operation. Accordingly, in some embodiments, records obtained from the data source represented by node 302 may be filtered, sorted, and joined with filtered records obtained from the data source represented by node 304. The records produced as a result of the join operation may be output to the data sink represented by output node 314.

The data sources represented by input nodes 302 and 304 may be of any suitable type. In some embodiments, the data sources represented by input nodes 302 and 304 may be a same type of data source (e.g., both may be SQL Server data sources). In other embodiments, when the input SQL query is a federated query, the data sources represented by input nodes 302 and 304 may be of different types (e.g., one data source may be an ORACLE data source and the other data source may be a TERADATA data source). In some embodiments, the output node 314 may represent a data sink of a same type as one or both of the data sources represented by input noes 302 and 304. In other embodiments, the data sink represented by output node 314 may be a different type altogether (e.g., the data sources may be DB2 data sources, whereas the data sink may be a MongoDB data sink).

In some embodiments, a data source/sink may be a flat file data source/sink, a multi-file data source/sink, a HADOOP data source/sink, an ORACLE data source/sink, a TERADATA data source/sink, a DB2 data source/sink, a Microsoft SQL SERVER data source/sink, an INFORMIX data source/sink, a MongoDB data source/sink, a SAP data source/sink, a metadata data source/sink, and/or any other suitable type of data source or data sink, as aspects of the technology described herein are not limited in this respect.

As shown in FIG. 3, the GUI 300 shows various types of tracking information for the SQL query from which the dataflow graph was generated. For example, during execution of the dataflow graph generated from the SQL query, the GUI 300 shows numbers of data records processed by each data processing operation represented by nodes in the graph. As one example, tracking information shown in GUI 300 includes: (1) information 316 indicating that 35,000 records have been read from the data source represented by input node 302; (2) information 318 indicating that 10,000 of these 35,000 records have been filtered; (3) information 320 indicating that 5,000 records have been read from the data source represented by input node 304; (4) information 322 indicating that 250 of these 5,000 records have been filtered; and (5) information 324 indicating that 75,323 records have been generated so far as a result of the join operation.

In some embodiments, the tracking information indicating the number of records processed by a data processing operation may provide an indication as to how close the data processing operation is to completion. For example, information 320 and 322 indicate that only 250 of 5000 data records have been processed so far by the filtering operation represented by node 308.

In some embodiments, the tracking information indicating the number of records processed by a data processing operation may provide an indication that there is a problem (e.g., a bottleneck or other inefficiency) with the query being executed. The tracking information may not only help to identify the presence of such a problem, but also may suggest a way to address the problem. For example, as shown in FIG. 3, information 324 indicates that 75,323 records are being output from a join operation, which has received no more than 10,000 records from one input and no more than 250 records from another input. This information suggests not only that the join operation presents a bottleneck, but also a way to fix the problem (e.g., because the large number of output records suggests that perhaps an outer join is being performed rather than an inner join which may have been intended).

In some embodiments, information indicating a number of records processed by a particular data processing operation (e.g., information 324) may be shown in association with the dataflow graph node representing the data processing operation (e.g., node 312). For example, the number of records processed may be shown at an output end of the node (e.g., near, above, below an edge leaving the node). As another example, the number of records processed may be shown at an input end of the node, within the node, above the node, or below the node, as aspects of the technology described herein are not limited in this respect.

Another example of tracking information for a SQL query that may be shown in the GUI 300 is information indicating whether or not each of one or more data processing operations has completed. For example, as shown in FIG. 3, the checkmarks 325 and 327 indicate that the filtering operations represented by nodes 306 and 308 have completed. By contrast, the symbols 326 and 328 provide respective indications that the sort and join operation have not yet completed.

Another example of tracking information for a SQL query that may be shown in the GUI 300 is information about each of one or more of the data processing operations represented by nodes in the dataflow graph. In some embodiments, such information may be revealed in response to a user providing input indicating that the user wishes to see more tracking information about a particular data processing operation (e.g., by clicking on a node representing the data processing operation, by moving a cursor over the node representing the data processing operation, or in any other suitable way).

Examples of information about a data processing operation include, but are not limited to, a number of data records already processed via the data processing operation, a degree of parallelism employed for performing the data processing operation (e.g., the number of physical and/or virtual devices used for performing the data processing operation), information identifying one or more physical and/or virtual devices used for performing the data processing operation, an amount of processing resources (e.g., CPU usage) used for performing the data processing operation, an amount of memory (volatile and/or non-volatile memory) used for performing the data processing operation, an amount of time used for performing the data processing operation, a measure of skew among processing loads on physical and/or virtual computing devices performing the data processing operations operation, parameters of the data processing operation (e.g., a key on which a join operation is being performed, a key on which a sorting operation is being performed, etc.), information indicating an estimate of time remaining until the data processing operation completes, and information indicating whether the data processing operation completed.

Figure 4A:
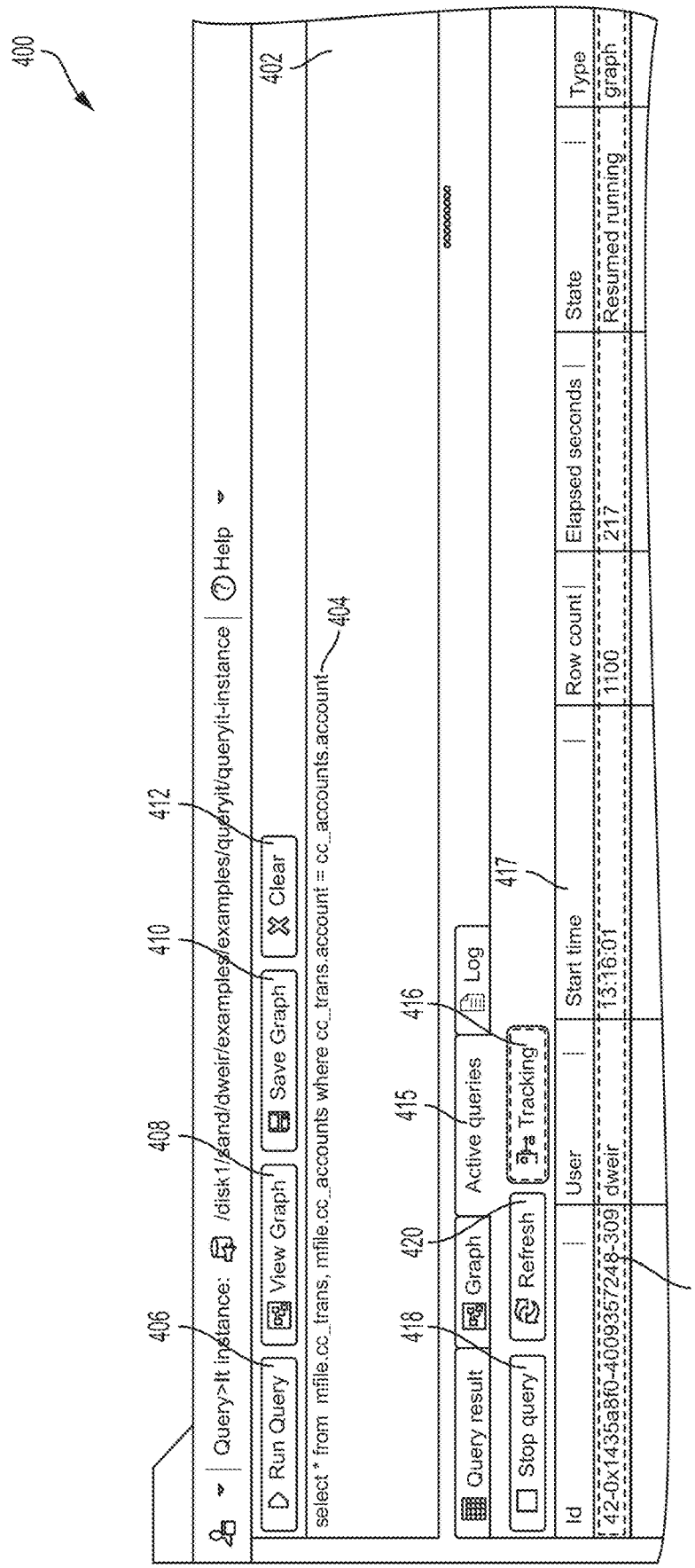
FIG. 4A is a diagram of another illustrative GUI showing information about active queries in a data processing system, in accordance with some embodiments of the technology described herein.

FIG. 4A is a diagram of another illustrative GUI 400 showing information about active queries in a data processing system, in accordance with some embodiments of the technology described herein. The GUI 400 allows a user to input one or more SQL queries, view dataflow graphs generated based on the input SQL queries, view summary information about active queries being executed by the data processing system, and access tracking information for the input SQL query during its execution.

As shown in FIG. 4A, GUI 400 includes an input portion 402 using which a user may input a SQL query into the data processing system. A user may provide the SQL query into input portion 402 by typing, cutting and pasting, dictating and/or in any other suitable way, as aspects of the technology described herein are not limited in this respect. An illustrative SQL query 404 is shown in FIG. 4A as having been entered into input portion 402. The user may select GUI control element 406 to start execution of the entered SQL query 404. The user may select GUI control element 408 to view a dataflow graph generated from the entered SQL query 404 (e.g., generated using query plan generator 106 and dataflow graph generator 108, as described with reference to FIG. 1). The user may select GUI control element 410 to save the graph generated from the entered SQL query 404. The user may select GUI control element 412 to clear the entered SQL query 404.

GUI 400 also includes a portion showing information about active queries in the data processing system. For example, as shown in FIG. 4A, active queries tab 415 includes a table 417 having a row of information for each query that is active in the data processing system. For example, table 417 includes row 414 containing information for a respective active query including a query identifier (first column of row 414), a user identifier (second column of row 414), information indicating when execution of the active query commenced (third column of row 414), information indicating how many records have been processed so far during execution of the active query (fourth column of row 414), and information indicating the state of the active query (fifth column of row 414). Table 417 may include any other suitable information about each active query in addition to or instead of the information shown in table 417, as aspects of the technology described herein are not limited in this respect. Although in the illustrative embodiment of FIG. 4A the information about active queries is shown as part of a table, in other embodiments, at least some of this information may be displayed in non-tabular form (e.g., using graphs, charts, visualizations, lists, etc.). Table 417 may include any suitable number of rows, even though only a single row is shown in FIG. 4A, as aspects of the technology described herein are not limited in this respect.

Figure 4B:
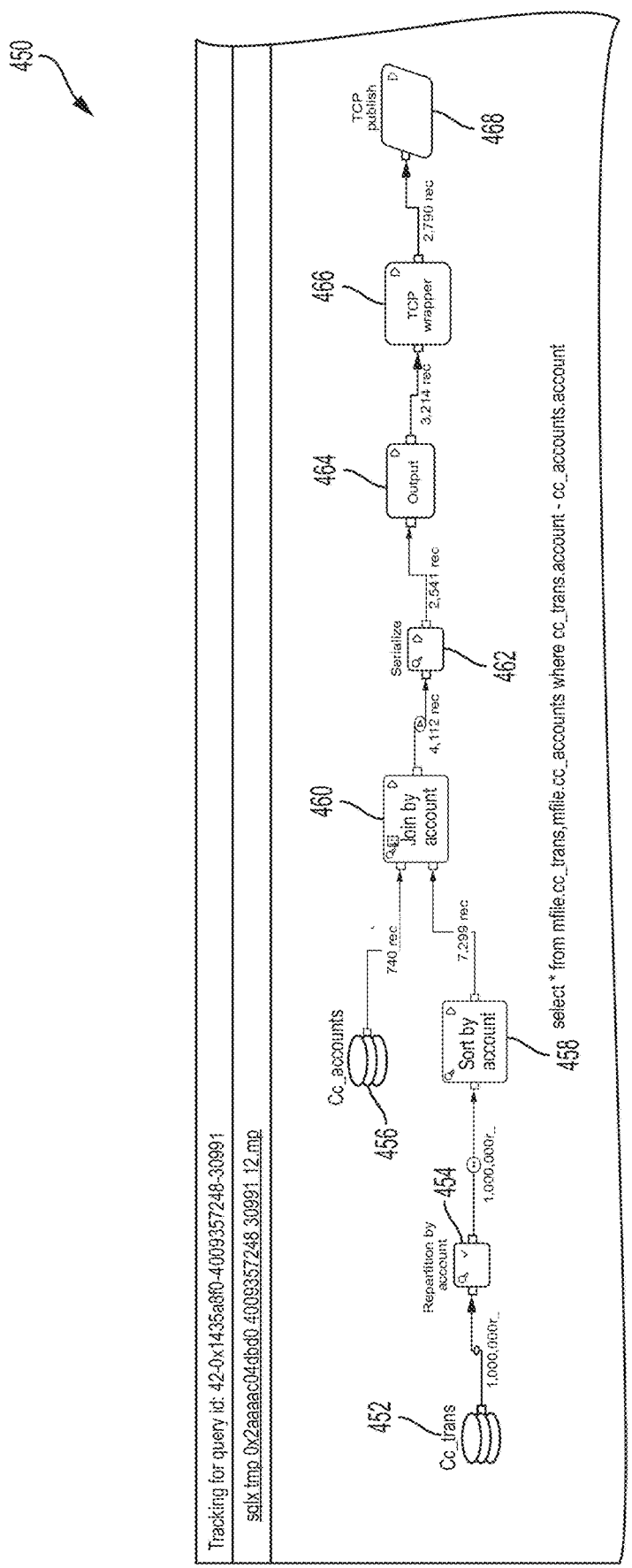
FIG. 4B is a diagram of another illustrative GUI showing tracking information for an input SQL query by showing tracking information for multiple data processing operations represented by nodes in a dataflow graph generated from the input SQL query, in accordance with some embodiments of the technology described herein.

As shown in FIG. 4A, GUI 400 further provides control elements which allow a user of the GUI 400 to perform one or more actions for one or more of the queries active on the data processing system. For example, GUI 400 provides a GUI control element 418 through which a user may stop execution of an active query (e.g., if the query has been executing for longer than expected, the number of records processed by the query is larger than expected, etc.). As another example, GUI 400 provides a GUI control element 420 through which a user may request that information about active queries be refreshed. For example, in response to a user selection of GUI control element 420, information indicating how long active queries have been executing and how many records have been processed may be updated in table 417. As yet another example, GUI 400 provides a GUI control element 416 through which a user may request that further information about a particular active query be provided. For example, in some embodiments, a user may select an active query (e.g., by selecting a row of table 417 or in any other suitable way) and select the GUI control element 416 (which in this illustrative example is a button labeled "Tracking" but may be any suitable type of GUI element other than a button) in response, another GUI showing more detailed tracking information for the selected active query may be generated and presented to the user. In some embodiments, the more detailed information may be provided in a non-tabular graphical user interface, an illustrative example of which is shown in FIG. 4B and is discussed below. The GUI 400 may have one or more other control elements in addition to or instead of the control elements 416, 418, and 420, as aspects of the technology described herein are not limited in this respect.

It should be appreciated that the GUI 400 may include one or more other GUI control elements in addition to or instead of the GUI control elements illustrated in FIG. 4A. It should also be appreciated that although the GUI control elements shown in the example of FIG. 4A are buttons, GUI control element may be of any other suitable type (e.g., radio buttons, checkboxes, text fields, etc.), as aspects of the technology described herein are not limited in this respect.

FIG. 4B is a diagram is a diagram of another illustrative GUI 450 showing tracking information for an input SQL query by showing tracking information for multiple data processing operations represented by nodes in a dataflow graph generated from the input SQL query, in accordance with some embodiments of the technology described herein. In this example, the tracking information shown in FIG. 4B is for the active query for which summary information is shown in row 414 of table 417 in GUI 400 shown in FIG. 4A.

As shown in FIG. 4B, the dataflow graph includes input nodes 452 and 456 representing respective data sources, an output node 468 representing a data sink, node 454 representing a repartition operation, node 458 representing a sorting operation, node 460 representing a join data processing operation, node 462 representing a serialize data processing operation, and nodes 464 and 466 representing output-related processing to prepare the data records to be published using a TCP connection.

The data sources represented by input nodes 452 and 454 may be of any suitable type. In some embodiments, the data sources represented by input nodes 452 and 454 may be a same type of data source (e.g., both may be SQL Server data sources). In other embodiments, when the input SQL query is a federated query, the data sources represented by input nodes 452 and 454 may be of different types (e.g., one data source may be an ORACLE data source and the other data source may be a TERADATA data source). In some embodiments, the output node 468 may represent a data sink of a same type as one or both of the data sources represented by input noes 452 and 454. In other embodiments, the data sink represented by output node 468 may be a different type altogether (e.g., the data sources may be DB2 data sources, whereas the data sink may be a MongoDB data sink).

As shown in FIG. 4B, the GUI 450 shows various types of tracking information for the SQL query from which the dataflow graph was generated. For example, during execution of the dataflow graph generated from the SQL query, the GUI 450 shows numbers of data records processed by each data processing operation represented by nodes in the graph. As one example, tracking information shown in GUI 350 includes: (1) information indicating that 1 million records have been read from the data source represented by input node 452; (2) information indicating that all of these records have been put through the repartitioning operation; (3) information indicating that 7,299 records have been processed by the sort data processing operation; (4) information indicating that 740 records have been read from the data source represented by input node 456; (5) information indicating that 4,112 records have been processed by the join operation represented by input node 460; and (6) information indicating that 2541, 3214, and 2790 records have been processed by the operations represented by nodes 464, 466, and 468, respectively. In addition, the checkmark shown in node 454 indicates that the data processing (repartitioning) operation represented by node 454 has been applied to all the data records, whereas the "play" symbol (triangle pointing to the right) indicates that processing has not yet completed for operations represented by nodes 458-468.

Figure 5A:
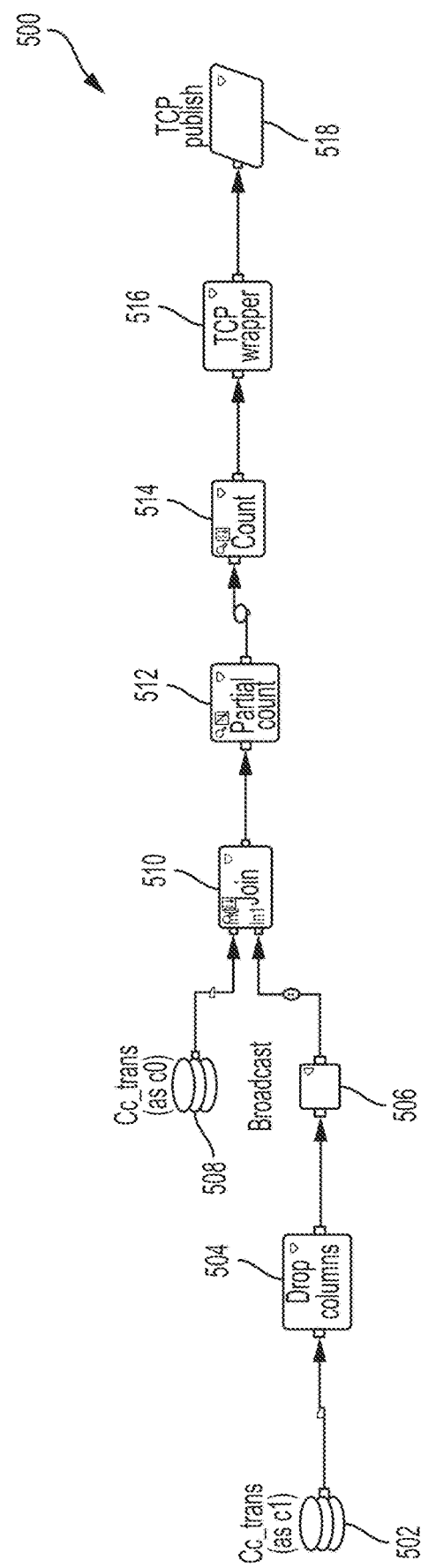
FIG. 5A is a diagram of an illustrative dataflow graph automatically generated from an input SQL query, in accordance with some embodiments of the technology described herein.

FIG. 5A is a diagram of an illustrative dataflow graph 500 automatically generated from an input SQL query, in accordance with some embodiments of the technology described herein. The dataflow graph 500 may be generated from the input SQL query, for example, by generating a query plan from the input query by using a query plan generator (e.g., query plan generator 106) and, subsequently, generating dataflow graph 500 from the generated query plan by using a dataflow graph generator (e.g., data flow generator 108), or in any other suitable way, as aspects of the technology described herein are not limited in this respect.

As shown in FIG. 5A, the dataflow graph 500 includes input nodes 502 and 508 representing respective data sources (e.g., databases of credit card transactions), nodes 516 and 518 for outputting data records over a network (e.g., using the transfer control protocol (TCP)), node 504 representing a drop columns operation whereby one or more columns are removed from the data records, node 506 representing the broadcast operation, node 510 representing a join data processing operation, node 512 representing a partial count operation, and node 514 representing a count data processing operation. The data sources from which graph 500 reads records and/or data sink to which the graph 500 writes records may be of any suitable type, examples of which are provided herein.

Figure 5B:
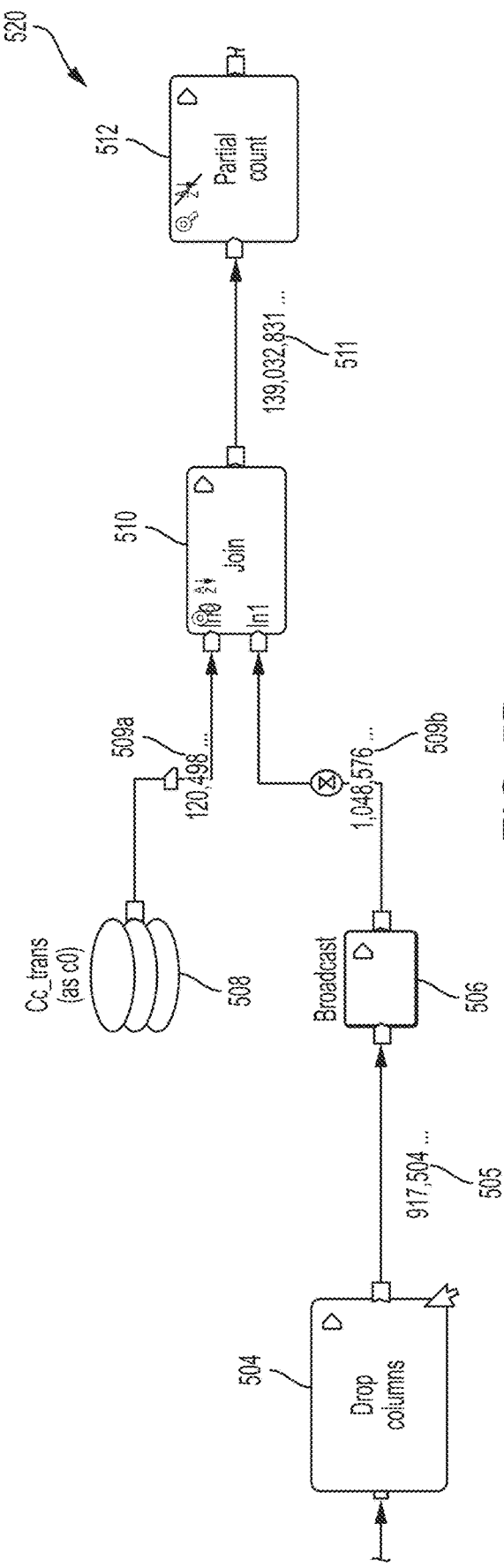
FIG. 5B is a diagram of an illustrative GUI showing tracking information for multiple data processing operations represented by nodes in the dataflow graph of FIG. 5A, in accordance with some embodiments of the technology described herein.

FIG. 5B is a diagram of an illustrative GUI showing tracking information for multiple data processing operations represented by nodes in the dataflow graph 500 of FIG. 5A, in accordance with some embodiments of the technology described herein. FIG. 5B shows a subgraph 520 of the dataflow graph 500 with tracking information overlaid thereon. For example, as shown in FIG. 5B, during execution of the dataflow graph 500 numbers of data records processed by at least some of the data processing operations represented by nodes in the subgraph 520 are shown in the GUI. As one example, the tracking information shown in FIG. 5B includes: (1) information 505 indicating that 917,504 records have been processed using the drop columns operation represented by node 504; (2) information 509*a* indicating that 128,498 records have been accessed from the data source represented by input node 508; (3) information 509*b* indicating that 1,048,576 records have be processed using the broadcast operation represented by node 506; and (4) and information 511 indicating that 139,032,831 records have been output as a result of join operation represented by node 510, which may indicate that the join operation is not efficiently implemented.

As described herein, tracking information for a SQL query is not limited only to the number of data records processed by various data processing operations in a dataflow graph generated from the SQL query. Tracking information may include any other suitable information about each of one or more data processing operations in a dataflow graph. For example, tracking information for a data processing operation may include, by way of example and not limitation: (1) information indicating a degree of parallelism employed for performing the data processing operation; (2)

information identifying one or more computing devices used for performing the data processing operation; (3) information indicating an amount of processing resources used for performing the data processing operation (e.g., total amount of processing resources used, average amount of processing resources used per record or per a threshold number of records, and/or any other suitable statistics); (3) information indicating an amount of memory used for performing the data processing operation (e.g., total amount of memory used, average amount of memory used per record or per a threshold number of records, and/or any other suitable statistics); (4) information indicating an amount of time used for performing the data processing operation (e.g., total amount of time elapsed, average amount of time used to apply the data processing operation per record or per a threshold number of records, and/or any other suitable statistics); (5) information indicating a measure of skew among processing loads on computing devices performing the data processing operation; (6) information indicating the rate at which records (or a threshold number or otherwise specified amount of records) are processed using the data processing operation; (7) information indicating values of one or more parameters of the data processing operation; and (8) information indicating whether the first operation completed.

As discussed herein, in some embodiments, tracking information for a SQL query includes tracking information for each of one or more data processing operations in the dataflow graph generated from the SQL query. In some embodiments, at least some of the tracking information for a data processing operation may be shown together with the dataflow graph. For example, as shown in FIG. 5B, the number of records processed by a data processing operation in the dataflow graph may be shown proximate a node in the dataflow graph representing the data processing operation. In some embodiments, at least some of the tracking information for a data processing operation may be shown in response to user input indicating that the user desires to see additional tracking information. For example, in some embodiments, the user may select a data processing operation and at least some of the tracking information for the data processing operation may be shown in response to the selection. A user may select a data processing operation by clicking on a node representing the data processing operation, positioning a mouse pointer above the node (e.g., a mouse over event), providing keyboard input, and/or in any other suitable way, as aspects of the technology described herein are not limited in this respect.

Figure 5C:
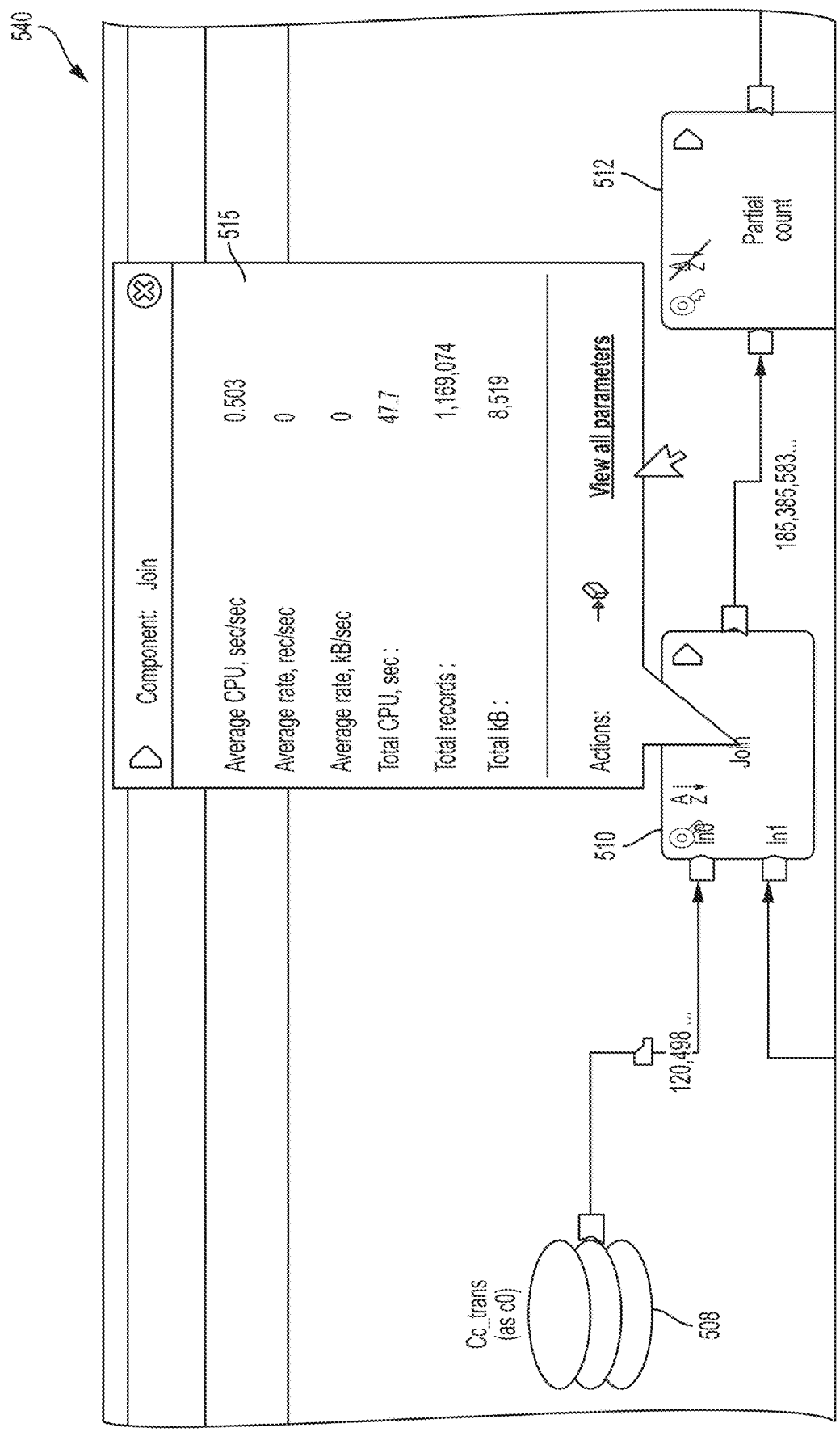
FIG. 5C is a diagram of illustrative tracking information for a data processing operation in a dataflow graph generated from an input SQL query, in accordance with some embodiments of the technology described herein.

For example, as shown in FIG. 5C, a user may select the node 510 representing the join data processing operation and, in response to the user's selection, additional tracking information for the join information is shown. In the example of FIG. 5C, the tracking information shown for FIG. 5C includes information indicating the number of records processed, the total amount of memory utilized, the total amount of processing resources utilized, average number of records processed per second, the average amount of time to process a kilobyte (kB) of records per second, and a link clicking which allows the user to view values of various parameters of the join operation, an illustrative example of which is shown in FIG. 5D.

FIG. 5D is a table 550 of values for at least some of the parameters associated with the join data processing operation shown in FIG. 5C, in accordance with some embodiments of the technology described herein. For example, the table 550 shows that the join data processing operation is configured to receive sorted input (see second row of table 550), that the join operation is an inner join (see fourth row), that the join operation is going to assume rather than check that the data is sorted (see the thirteenth row), and other parameter values.

Figure 6:
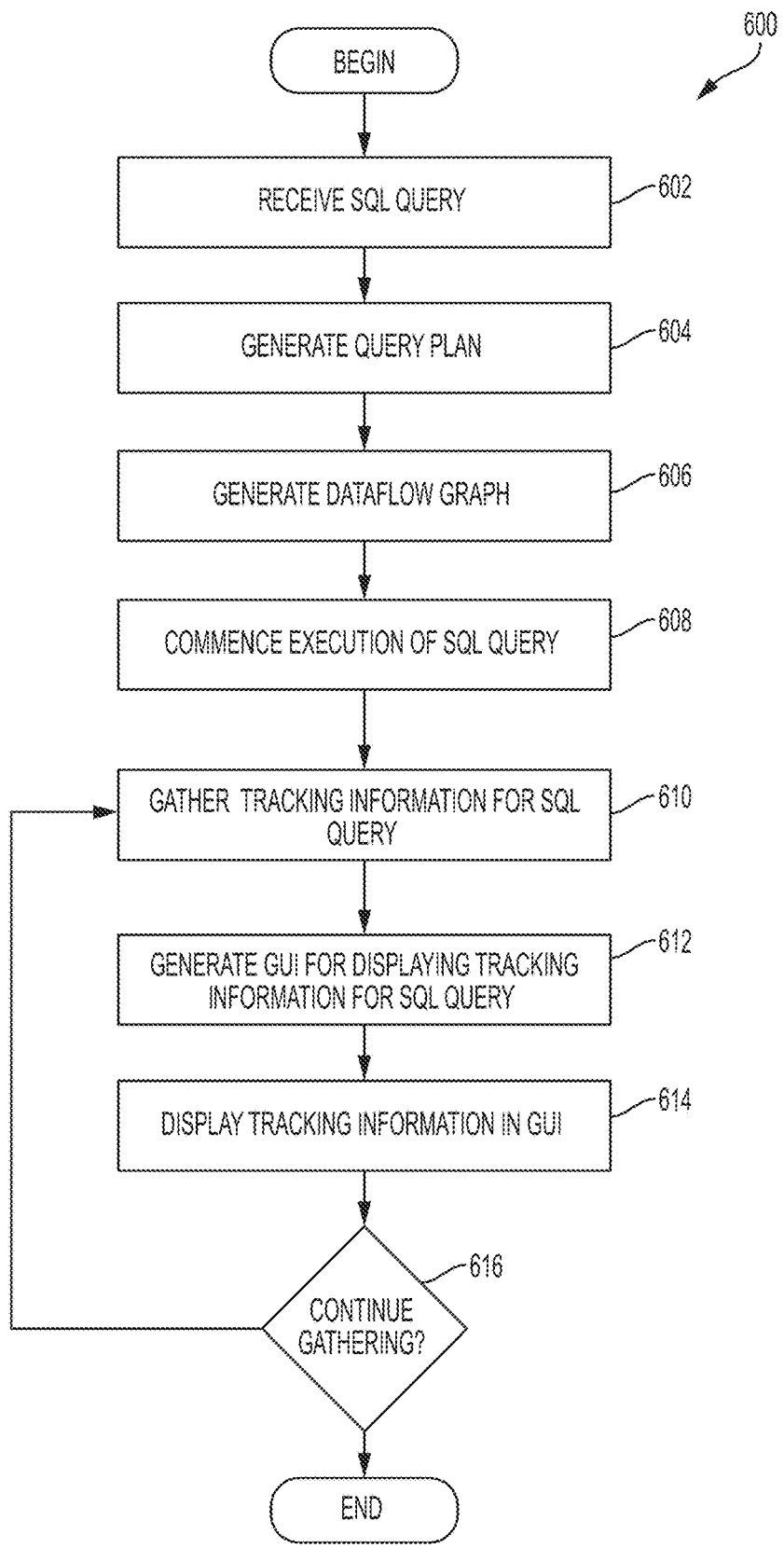
FIG. 6 is a flowchart of an illustrative process 600 for tracking SQL queries in accordance with some embodiments of the technology described herein.

FIG. 6 is a flowchart of an illustrative process 600 for tracking SQL queries in accordance with some embodiments of the technology described herein. Process 600 may be executed using any suitable data processing system including, for example, data processing system 100 described with reference to FIG. 1.

Process 600 begins at act 602, where a SQL query is received. In some embodiments, the SQL query may be received by the data processing system executing process 600 as a result of a user providing the SQL query as input to the data processing system. The user may input the SQL query through a graphical user interface (e.g., as shown in FIG. 4A) or any other suitable interface. In other embodiments, the SQL query may be provided to the data processing system by another computer program. For example, the SQL query may be provided by a computer program configured to cause the data processing system to execute one or more SQL queries, each of which may have been specified by a user or automatically generated. The SQL query may be of any suitable type and may be provided in any suitable format, as aspects of the technology described herein are not limited in this respect.

Next, process 600 proceeds to act 604, where a query plan is generated from the SQL query received at act 602. The generated query plan may identify one or more data processing operations to be performed if the SQL query were executed. The generated query plan may further specify an order in which the identified data processing operations are to be executed. As such, the generated query plan may represent a sequence of data processing operations to perform in order to execute the SQL query received at act 602. The generated query plan may be generated using any suitable type of query plan generator (e.g., query plan generator 106). Some illustrative techniques for generating query plans are described in U.S. Pat. No. 9,116,955, titled "Managing Data Queries," which is incorporated by reference herein in its entirety.

Next, process 600 proceeds to act 606, where a dataflow graph is generated from the query plan generated at act 604 using the SQL query received at act 602. In some embodiments, the dataflow graph may be generated from a query plan at least in part by generating the dataflow graph to include a node for each of at least a subset (e.g., some or all) of the data processing operations identified in the query plan. Subsequently, the order of data processing operations specified in the query plan may be used to generate links connecting nodes in the dataflow graph. For example, when the generated query plan indicates that a first data processing operation is performed before a second data processing operation, the generated dataflow graph may have a first node (representing the first data processing operation) and a second node (representing the second data processing operation) and one or more links specifying a path from the first node to the second node.

In some embodiments, generating the dataflow graph from the query plan comprises adding one or more nodes to the graph representing input and/or output data sources. For example, generating the dataflow graph may comprise adding an input node for each of the data sources from which data records are to be read during execution of the SQL query. Each of the input nodes may be configured with parameter values associated with the respective data source. These values may indicate how to access the data records in the data source. As another example, generating the dataflow graph may comprise adding an output node for each of the data sinks to which data records are to be written during execution of the SQL query. Each of the output nodes may be configured with parameter values associated with the respective data sinks. These values may indicate how to write the data records to the data source.

In some embodiments, generating the dataflow graph may comprise determining a processing layout for performing the data processing operations in the dataflow graph. The processing layout for a data processing operation may specify how many computing devices are to be used for performing the data processing operation and may identify the particular computing devices to be used to perform the data processing operation. For example, generating the dataflow graph may comprise determining, for each of one or more nodes, whether the data processing operation is to be performed using a single device (e.g., a single processor, a single virtual machine, etc.) or multiple devices (e.g., multiple processors, multiple virtual machines, etc.) and which devices should be used. In some embodiments, different degrees of parallelism may be assigned to different nodes. As such, it should be appreciated that different processing layouts may be assigned to different data processing operations that are to be performed during execution of the dataflow graph generated from the SQL query obtained at act 602.

It should be appreciated that the dataflow graph generated at act 606 is different from the query plan generated at act 604. A dataflow graph can be executed by a graph execution engine (e.g., graph execution engine 115), whereas a query plan cannot be executed by the graph execution engine—it is an intermediate representation that is used to generate the dataflow graph, which dataflow graph is executed by the graph execution engine in order to execute the SQL query. A query plan is not executable and, even in the context of a relational database management system, it needs to be further processed to generate an execution strategy. By contrast, a dataflow graph is executable by the graph execution engine in order to perform the SQL query. In addition, even after further processing by a relational database system, the resulting execution strategy does not allow for reading data from and/or writing data to other types of data sources and/or data sinks, whereas dataflow graphs are not limited in this respect.

In some embodiments, the dataflow graph generated at act 606 may contain a node representing a data processing operation, which is not in the query plan generated at act 604. Conversely, in some embodiments, the dataflow graph generated at act 606 may not contain a node representing a data processing operation, which is in the query plan generated at act 604. Such situations may arise due to various optimizations which may be performed during the process of generating a dataflow graph from a query plan. In some embodiments, the dataflow graph generated at act 606 may contain a node representing a data processing operation other than a database operation being performed on a database computer system (e.g., a relational database management system).

In some embodiments, the query plan and the dataflow graph may be embodied in different types of data structures. For example, in some embodiments, the query plan may be embodied in a directed graph in which each node has a single parent node (e.g., a tree, such as, for example, a binary tree), whereas the dataflow graph may be embodied in a directed acyclic graph, which may have at least one node that has multiple parent nodes.

Next, process 600 proceeds to act 608, where execution of the SQL query is commenced. In some embodiments, the execution of the SQL query may be commenced by starting to execute the dataflow graph generated at act 606 using the graph execution engine (e.g., graph execution engine 115). In some embodiments, the dataflow graph generated at act 606 may be executed as soon as it is generated and without any user input. In other embodiments, the dataflow graph generated at act 606 may be generated, but its execution may begin only in response to a command to do so, which command may be provided by a user through an interface (e.g., through the GUI shown in FIG. 4A) or by another computer program (e.g., through an API call).

Next, process 600 proceeds to act 610, where tracking information for the SQL query being executed is gathered. This may be done in any suitable way. For example, the graph execution engine executing the dataflow graph generated at act 606 may be configured to monitor execution of each of one or more data processing operations in the dataflow graph and may collect information during the execution from which information the tracking data may be obtained. The collected information may include at least some of the tracking data directly and/or at least some of the tracking data may be derived from the collected information. By way of example and not limitation, the graph execution engine may keep track of the number of data records processed by a particular data processing operation, the amount of processing power and/or memory utilized by a data processing operation, and/or any other suitable tracking information, examples of which are provided herein. This collected information, in turn, may include at least some of the tracking information being gathered and/or at least some of the tracking information may be derived from this collected information.

Next, process 600 proceeds to acts 612 and 614, where a GUI for displaying tracking information for the SQL query may be generated and used to display tracking information for the SQL query. In some embodiments, the GUI may include a visual representation of the dataflow graph generated from the SQL query at act 606. Examples of such GUIs are shown in FIGS. 3, 4B, and 5A-5C. The GUI may display at least some of the tracking information on the same screen as the dataflow graph. For example, the GUI may display the number of data records processed by each of the data processing operations. As another example, the GUI may display one or more values for the parameters of the data processing operations. In some embodiments, the GUI may display (either automatically or in response to a user indication to do so) additional tracking information. Examples of this are described herein including with reference to FIGS. 5C and 5D.

Next, process 600 proceeds to act 616, where a determination is made as to whether to continue gathering the tracking data. This determination may be made in any suitable way. For example, in some embodiments, if the execution of the dataflow graph has been completed, canceled, or paused (e.g., in response to receiving an indication from a user or another computer program to pause execution), it may be determined to not continue gathering the tracking data and process 600 completes. On the other hand, if execution of the dataflow graph is ongoing (e.g., it has not been completed, canceled, or paused), then it may be determined that gathering the tracking information is to be continued and process 600 returns to act 610.

It should be appreciated that process 600 is illustrative and that there are variations. For example, in some embodiments, tracking information may be gathered and stored for subsequent use, but a GUI to display the tracking information may not be generated, or may be generated and not displayed. In such embodiments, any one, any two, or all of acts 610, 612, and 614 may be omitted. In some embodiments, acts 602-608 of process 600 may be performed by one software program and acts 610-614 may be performed by a different computer program.

Figure 7:
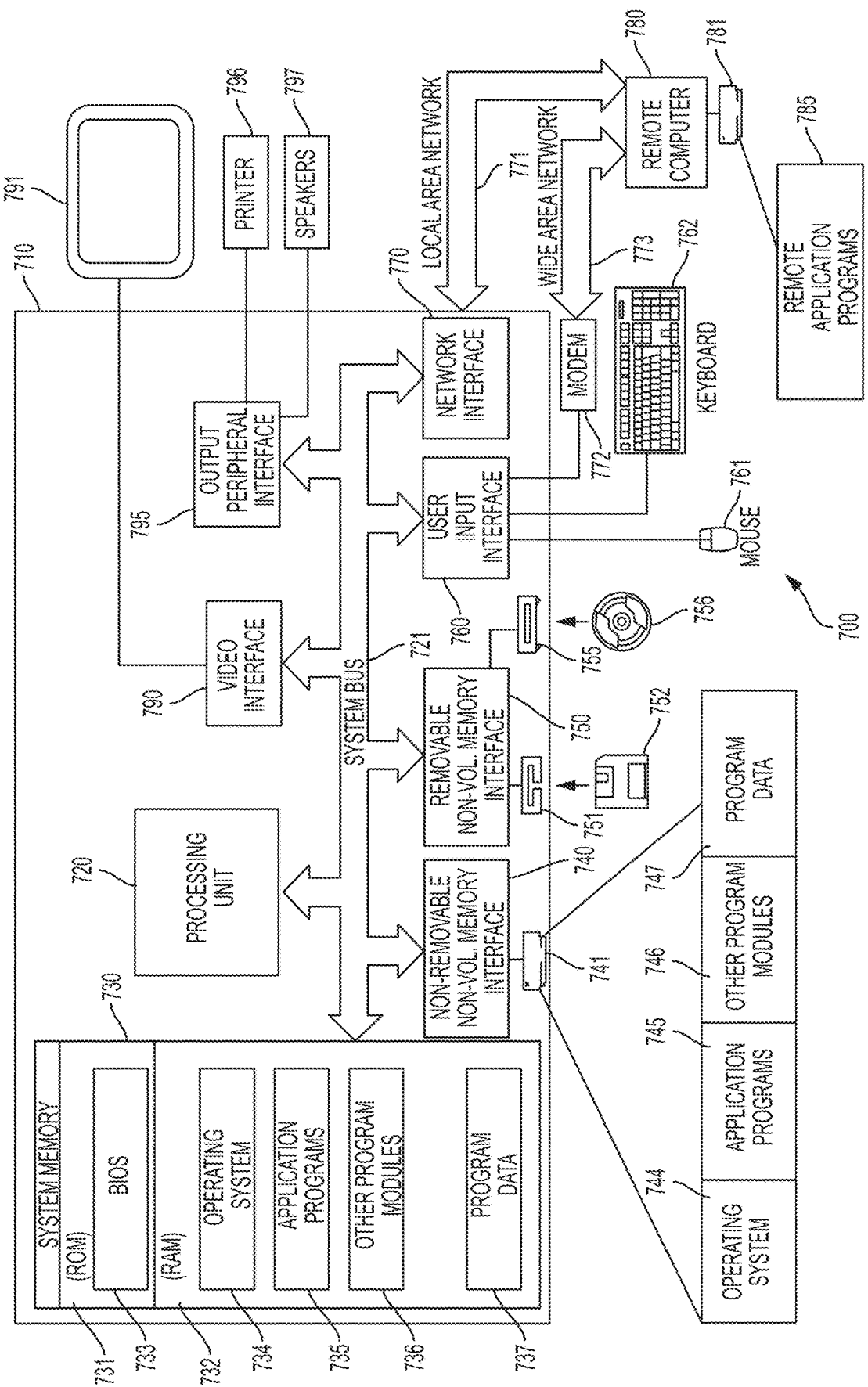
FIG. 7 is a block diagram of an illustrative computing system environment that may be used in implementing some embodiments of the technology described herein.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another and the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data processing system configured to communicate with a database system and a data source external to the database system, the data processing system comprising:
   at least one computer hardware processor; and
   at least one non-transitory computer-readable storage medium storing processor-executable instructions that, when executed by the at least one computer hardware processor, cause the at least one computer hardware processor to perform:
      obtaining a federated structured query language (SQL) query for generating output data using data to be received from the database system and data to be received from the data source external to the database system;
      generating a query plan for the federated SQL query, the query plan comprising a plurality of data processing operations to be performed by the data processing system including at least a first data processing operation for processing data obtained based on the data to be received from the database system and a second data processing operation for processing data obtained based on the data to be received from the data source external to the database system;
      displaying a graphical user interface (GUI) containing a plurality of GUI elements including a first GUI element representing the first data processing operation and a second GUI element representing the second data processing operation;
      during execution of the federated SQL query,
         gathering tracking information for the federated SQL query including:
            gathering first tracking information relating to execution of the first data processing operation for processing data obtained based on data that has been received by the data processing system from the database system; and
            gathering second tracking information relating to execution of the second data processing operation for processing data obtained based on data that has been received by the data processing system from the data source external to the database system; and
         displaying, in the GUI, at least some of the first tracking information in association with the first GUI element and at least some of the second tracking information in association with the second GUI element,
      wherein the data processing system is external to the database system and external to the data source, and
      wherein the data processing system is configured to execute software that performs the obtaining the federated SQL query, the generating the query plan for the federated SQL query, and the gathering the tracking information for the federated SQL query during execution of the federated SQL query.

2. The data processing system of claim 1, wherein the database system is a relational database system.

3. The data processing system of claim 1, wherein the data source is a flat file data source, a multi-file data source, or a Hadoop data source.

4. The data processing system of claim 1, wherein the graphical user interface is non-tabular.

5. The data processing system of claim 1, wherein displaying the GUI comprises generating a graphical representation of a graph at least in part by:
 generating the first GUI element to represent a first node of the graph associated with the first data processing operation; and
 generating the second GUI element to represent a second node of the graph associated with the second data processing operation.

6. The data processing system of claim 5, wherein the generating the graphical representation of a graph comprises generating a graphical representation of a dataflow graph for executing the SQL query.

7. The data processing system of claim 6, wherein generating the graphical representation of the dataflow graph further comprises generating a third GUI element representing an edge between the first node of the dataflow graph and the second node of the dataflow graph.

8. The data processing system of claim 6, wherein the processor-executable instructions further cause the at least one computer hardware processor to perform:
 generating, based on the query plan, at least one data structure representing the dataflow graph, the dataflow graph comprising a plurality of nodes including the first node and the second node and a plurality of edges connecting the plurality of nodes, each of the plurality of nodes corresponding to a respective data processing operation in the plurality of data processing operations, the plurality of edges representing flows of data among nodes in the plurality of nodes.

9. The data processing system of claim 5, wherein gathering the first tracking information for the first data processing operation comprises tracking a number of data records processed via the first data processing operation, and wherein displaying, via the GUI at least some of the first tracking information comprises displaying, in association with the first GUI element, the number of data records processed via the first data processing operation.

10. The data processing system of claim 9, wherein displaying, in association with the first GUI element, the number of data records processed via the first data processing operation, comprises displaying the number of data records processed via the first data processing operation at an output end of the first node.

11. The data processing system of claim 10, wherein gathering the second tracking information for the second data processing operation comprises tracking a number of data records processed via the second data processing operation, and wherein displaying, via the GUI at least some of the second tracking information comprises displaying, in association with the second GUI element, the number of data records processed via the second data processing operation.

12. The data processing system of claim 1, wherein gathering first tracking information for the first data processing operation comprises gathering tracking information selected from the group consisting of: a number of data records processed via the first data processing operation, a degree of parallelism employed for performing the first data processing operation, information identifying one or more computing devices used for performing the first data processing operation, an amount of processing resources used for performing the first data processing operation, an amount of memory used for performing the first data processing operation, an amount of time used for preforming the first data processing operation, a measure of skew among processing loads on computing devices performing the first data processing operation, parameters of the first data processing operation, and information indicating whether the first data processing operation completed.

13. The data processing system of claim 1, wherein gathering first tracking information for the first data processing operation comprises identifying one or more parameters of the first data processing operation and wherein displaying at least some of the first tracking information comprises displaying at least one value of at least one of the identified one or more parameters.

14. The data processing system of claim 1, wherein the processor-executable instructions further cause the at least one computer hardware processor to perform:
 displaying a second GUI displaying a list of one or more SQL queries being executed by the data processing system, the one or more SQL queries including the SQL query; and
 in response to a user selection, via the second GUI, of the SQL query, generating the GUI containing the plurality of GUI elements including the first GUI element representing the first data processing operation and the second GUI element representing the second data processing operation.

15. The data processing system of claim 1, wherein the processor-executable instructions further cause the at least one computer hardware processor to perform:
 displaying a second GUI displaying a list of one or more SQL queries being executed by the data processing system, the one or more SQL queries including the SQL query; and
 in response to a user selection, via the second GUI, of the SQL query, stopping execution of the SQL query.

16. The data processing system of claim 1, wherein the displaying further comprises refreshing the displayed at least some of the first tracking information.

17. At least one non-transitory computer-readable storage medium storing processor-executable instructions that, when executed by at least one computer hardware processor in a data processing system configured to communicate with a database system and a data source external to the database system, cause the at least one computer hardware processor to perform:
 obtaining a federated structured query language (SQL) query for generating output data using data to be received from the database system and data to be received from h data source external to the database system;
 generating a query plan for the federated SQL query, the query plan comprising a plurality of data processing operations to be performed by the data processing system including at least a first data processing operation for processing data obtained based on the data to be received from the database system and a second data processing operation for processing data obtained based on the data to be received from the data source external to the database system;
 displaying a graphical user interface (GUI) containing a plurality of GUI elements including a first GUI element representing the first data processing operation and a second GUI element representing the second data processing operation;

during execution of the federated SQL query,
gathering tracking information for the federated SQL query including:
gathering first tracking information relating to execution of the first data processing operation for processing data obtained based on data that has been received by the data processing system from the database system; and
gathering second tracking information relating to execution of the second data processing operation for processing data obtained based on data that has been received by the data processing system from the data source external to the database system; and
displaying, in the GUI, at least some of the first tracking information in association with the first GUI element and at least some of the second tracking information in association with the second GUI element,
wherein the data processing system is external to the database system and external to the data source, and
wherein the data processing system is configured to execute software that performs the obtaining the federated SQL query, the generating the query plan for the federated SQL query, and the gathering the tracking information for the federated SQL query during execution of the federated SQL query.

18. A method, performed by at least one computer hardware processor in a data processing system configured to communicate with a database system and a data source external to the database system, the method comprising:
obtaining a federated structured query language (SQL) query for generating output data using data to be received from the database system and data to be received from h data source external to the database system;
generating a query plan for the federated SQL query, the query plan comprising a plurality of data processing operations to be performed by the data processing system including at least a first data processing operation for processing data obtained based on the data to be received from the database system and a second data processing operation for processing data obtained based on the data to be received from the data source external to the database system;
displaying a graphical user interface (GUI) containing a plurality of GUI elements including a first GUI element representing the first data processing operation and a second GUI element representing the second data processing operation;
during execution of the federated SQL query,
gathering tracking information for the federated SQL query including:
gathering first tracking information relating to execution of the first data processing operation for processing data obtained based on data that has been received by the data processing system from the database system; and
gathering second tracking information relating to execution of the second data processing operation for processing data obtained based on data that has been received by the data processing system from the data source external to the database system; and
displaying, in the GUI, at least some of the first tracking information in association with the first GUI element and at least some of the second tracking information in association with the second GUI element,
wherein the data processing system is external to the database system and external to the data source, and
wherein the data processing system is configured to execute software that performs the obtaining the federated SQL query, the generating the query plan for the federated SQL query, and the gathering the tracking information for the federated SQL query during execution of the federated SQL query.

19. At least one non-transitory computer-readable storage medium storing processor-executable instructions for execution by at least one computer hardware processor in a data processing system configured to communicate with a database system and a data source external to the database system, the processor-executable instructions comprising:
means for obtaining a federated structured query language (SQL) query for generating output data using data to be received from h database system and data to be received from the data source external to the database system;
means for generating a query plan for the federated SQL query, the query plan comprising a plurality of data processing operations to be performed by the data processing system including at least a first data processing operation for processing data obtained based on the data to be received from the database system and a second data processing operation for processing data obtained based on the data to be received from the data source external to the database system;
means for displaying a graphical user interface (GUI) containing a plurality of GUI elements including a first GUI element representing the first data processing operation and a second GUI element representing the second data processing operation;
means for, during execution of the federated SQL query, gathering tracking information for the federated SQL query including:
gathering first tracking information relating to execution of the first data processing operation for processing data obtained based on data that has been received by the data processing system from the database system; and
gathering second tracking information relating to execution of the second data processing operation for processing data obtained based on data that has been received by the data processing system from the data source external to the database system; and
means for displaying, in the GUI, at least some of the first tracking information in association with the first GUI element and at least some of the second tracking information in association with the second GUI element,
wherein the data processing system is external to the database system and external to the data source, and
wherein the data processing system is configured to execute software that performs the obtaining the federated SQL query, the generating the query plan for the federated SQL query, and the gathering the tracking information for the federated SQL query during execution of the federated SQL query.

* * * * *

UNITED STATES PATENT AND TRADEMARK OFFICE
CERTIFICATE OF CORRECTION

PATENT NO. : 11,188,434 B2  
APPLICATION NO. : 15/835823  
DATED : November 30, 2021  
INVENTOR(S) : Glenn John Allin et al.

Page 1 of 1

It is certified that error appears in the above-identified patent and that said Letters Patent is hereby corrected as shown below:

In the Claims

At Column 26, Claim 12, Line number 2:  
operation, an amount of time used for preforming the first  
Should read:  
operation, an amount of time used for performing the first At Column 26, Claim 17, Line number 52:  
received from h data source external to the database  
Should read:  
received from the data source external to the database At Column 27, Claim 18, Line number 34:  
received from h data source external to the database  
Should read:  
received from the data source external to the database At Column 28, Claim 19, Line number 20:  
received from h database system and data to be  
Should read:  
received from the database system and data to be Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*